(12) United States Patent
Marshall

(10) Patent No.: US 6,829,214 B1
(45) Date of Patent: Dec. 7, 2004

(54) MULTI-PART COMMUNICATIONS CARD ASSEMBLY

(75) Inventor: Robert A. Marshall, Georgetown, TX (US)

(73) Assignee: Cisco Technology, Inc., San Jose, CA (US)

( * ) Notice: Subject to any disclaimer, the term of this patent is extended or adjusted under 35 U.S.C. 154(b) by 729 days.

(21) Appl. No.: 09/751,587

(22) Filed: Dec. 27, 2000

(51) Int. Cl.[7] .............................................. G01R 31/08
(52) U.S. Cl. ......................... 370/216; 361/737; 714/2
(58) Field of Search .............................. 370/216, 217, 370/218, 219, 220, 225, 228; 714/1, 2, 3, 4; 439/76.1; 361/737, 730, 724

(56) References Cited

U.S. PATENT DOCUMENTS 5,596,569 A * 1/1997 Madonna et al. ........... 370/217
5,982,744 A * 11/1999 Cantwell et al. ............ 370/217
6,480,487 B1 * 11/2002 Wegleitner et al. ......... 370/354
6,498,792 B1 * 12/2002 Johnson et al. ............. 370/388
6,594,358 B1 * 7/2003 George ....................... 379/325
6,636,478 B1 * 10/2003 Sensel et al. ................ 370/216
6,639,894 B1 * 10/2003 Sensel et al. ................ 370/217
6,675,254 B1 * 1/2004 Wachel ....................... 710/316

* cited by examiner

Primary Examiner—Min Jung
(74) Attorney, Agent, or Firm—Baker Botts L.L.P.

(57) ABSTRACT

A card assembly for insertion in a slot of a communications equipment rack includes a first part and a second part removably coupled to each other. The first part includes a communications module, and the second part includes a switching module that, in a first state, couples subscriber lines to the communications module and, in a second state, couples the subscriber lines to backup communications equipment. In addition, using the switching module, the second part can maintain the coupling of subscriber lines to the backup communications equipment when the first part is removed from the card assembly.

23 Claims, 3 Drawing Sheets

MULTI-PART COMMUNICATIONS CARD ASSEMBLY

TECHNICAL FIELD OF THE INVENTION

The present invention relates generally to communications cards and more particularly to multi-part communications card assemblies.

BACKGROUND OF THE INVENTION

In many communications equipment racks, a redundancy card provides backup communications services when a primary card fails. A primary card typically has modems to provide communications services and a relay able to switch to a redundancy card if one or more of the modems fail. Thus, in the event of a failure, subscribers suffer only a brief interruption in service as the relay switches to the redundant card and the redundant card takes over communications. However, when the primary card is replaced, the subscribers potentially suffer an extended disruption of service, since the removal of the primary card removes the redundancy relay and thus severs the connection between the subscribers and the redundant card. This delay can be minimized by a quick replacement of the failed primary card with a new primary card and by ensuring that relays on the new primary card connect the subscribers to the redundant card immediately upon insertion. This allows the redundant card to provide service for the subscribers while the new board is downloaded and made available.

SUMMARY OF THE INVENTION

In accordance with the present invention, a multi-part communications card assembly is provided which substantially eliminates or reduces disadvantages and problems associated with previous card assemblies. In a particular embodiment, the present invention satisfies a need for a card assembly that allows replacement of failed communications modules while maintaining links between subscriber lines and a redundancy bus.

According to one embodiment of the present invention, a card assembly for insertion in a slot of a communications equipment rack includes a first part and a second part removably coupled to each other. The first part includes a communications module, and the second part includes a switching module. The switching module of the second part operates in a first state to couple subscriber lines to the communications module and operates in a second state to couple the subscriber lines to a redundancy bus when the first part is removed from the card assembly.

In accordance with another embodiment of the present invention, a communications equipment rack includes a backplane having a redundancy bus and a subscriber interface that couples to subscriber lines. The equipment rack also includes a network interface card coupled to a network and to the backplane. The equipment rack includes at least one card assembly having a first part that includes a communications module and a second part removably coupled to the first part, with the second part including a switching module. The switching module of the second part operates in a first state to couple selected subscriber lines to the communications module and operates in a second state to couple the selected subscriber lines to the redundancy bus when the first part is removed from the second part. In addition, the equipment rack includes at least one slot having guides for accepting each card assembly, wherein the guides facilitate the removal of a selected first part from the rack while a corresponding second part operates in the second state to couple the selected subscriber lines to the redundancy bus.

Various embodiments of the present invention provide numerous technical advantages. Multi-part communications card assemblies allow replacement of failed communications modules without disrupting service provided by backup communications cards. For example, the portion of a card assembly containing failed communications modules may be removed and replaced while another portion of the card assembly maintains a link between subscriber lines and a redundancy card. This permits modules on a card assembly having relatively high failure rates to be replaced more often than modules having relatively low failure rates. Also, by providing card assemblies for insertion in a single slot of a communications equipment rack, a single multi-part card assembly can be designed according to depth standards such as European Telecommunications Standards Institute (ETSI) standards and Competitive Local Exchange Carrier (CLEC) standards.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE DRAWINGS

Figure 1:
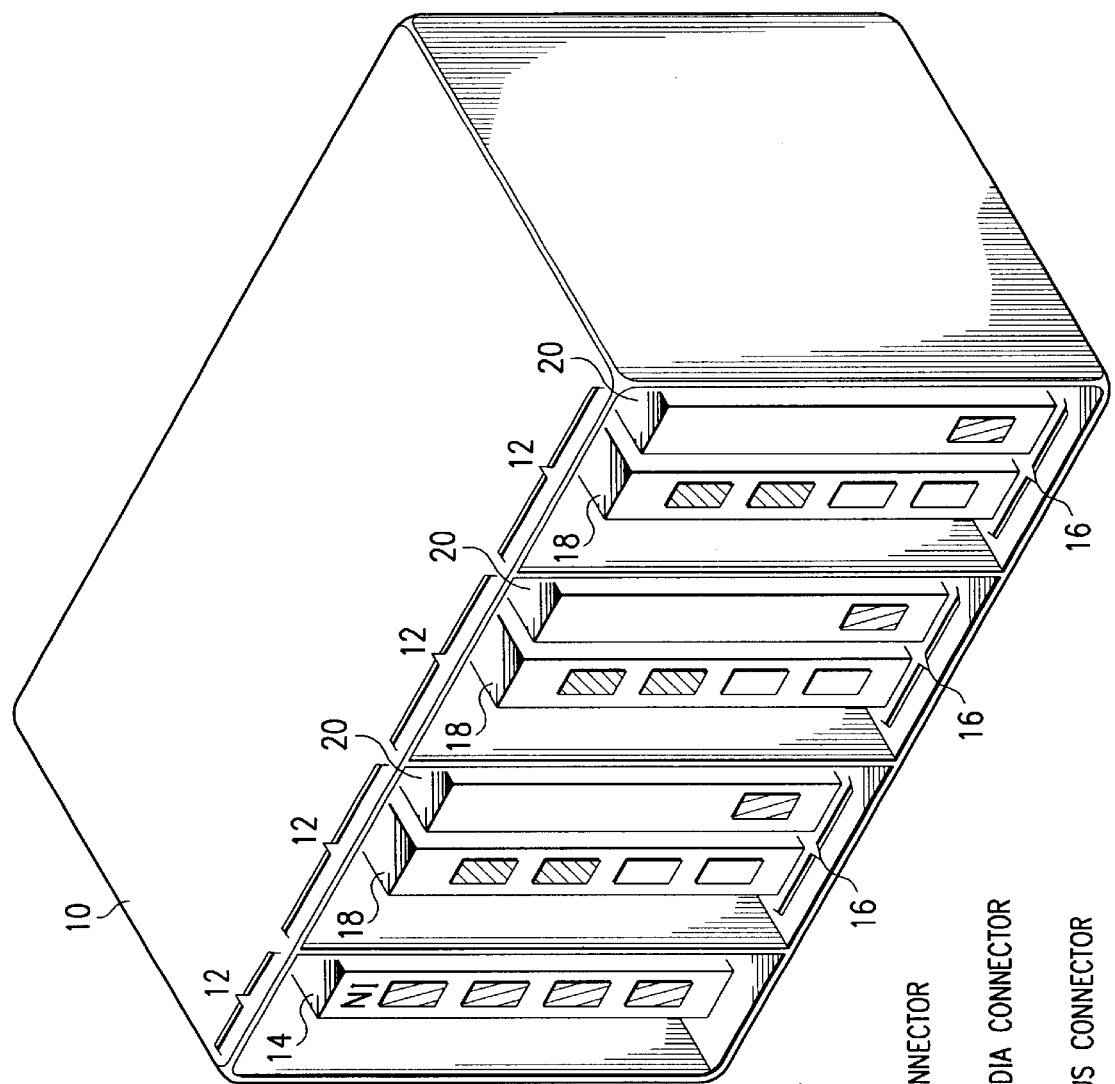
FIG. 1 illustrates a communications equipment rack having a network interface card and a number of multi-part card assemblies.

FIG. 1 illustrates a communications equipment rack 10 having slots 12 for housing cards and card assemblies. This illustrates rack 10 with its backplane removed to expose various card assemblies and the connectors on these assemblies to couple to the backplane. In slots 12, rack 10 includes a network interface card 14 and multi-part card assemblies 16. Each multi-part card assembly 16 in rack 10 includes a redundancy switching part 18 and a communications equipment part 20. In general, card assemblies 16 couple to subscriber lines using switching part 18 and provide communications services to subscribers coupled to the subscriber lines using communications equipment on communications part 20. In the event of a failure of communications equipment on communications part 20, switching modules on switching part 18 couple the subscriber lines to a redundancy bus which provides access to backup communications equipment. The failed communications part 20 may be removed from rack 10 while switching park 18 remains in rack 10 and maintains the link between the subscriber lines and the redundancy bus. Thus, communications parts 20 may be replaced without disrupting links to backup communications equipment provided by switching parts 18.

In this illustration, network interface card 14 and card assemblies 16 include a number of connectors having types indicated by the legend. Network interface card 14 and communications parts 20 each have high speed connectors, with the symbol for a high speed connector indicated generally at 22. Switching parts 18 include subscriber media connectors, with the symbol for a subscriber media connector indicated generally at 24, and include redundancy bus connectors, with the symbol for a redundancy bus connector indicated generally at 26. At least some of the connectors for these cards connect to a backplane of rack 10 in order to couple these cards to each other and to remote devices.

Subscriber media connectors 24 couple to subscriber lines on the backplane of rack 10 to provide subscribers access to communications equipment on communications part 20 of card assembly 16. Redundancy bus connectors 26 couple switching part 18 to a redundancy bus on the backplane of rack 10 to provide subscribers a link to redundant cards in case of failure of communications equipment on communications part 20. Thus, switching part 18 provides subscribers access to communications equipment on communications part 20, and in certain circumstances, switching part 18 provides subscribers access to backup communications equipment. However, in certain embodiments, not all of the connectors couple to a backplane of rack 10. For example, subscriber media connectors 24 may couple to subscriber lines on the front of rack 10, such that the backplane of rack 10 provides only interconnectivity between card assemblies 16 and network interface card 14.

Communications part 20 couples to network interface card 14 using high speed connector 22. For example, a connection on the backplane of rack 10 may link high speed connector 22 of communications part 20 to high speed connector 22 on network interface card 14. Network interface card 14 couples to outside networks and provides card assemblies 16 access to these outside networks through high speed connectors 22. Outside networks represent networks such as the public switched telephone network (PSTN), a global computer network such as the Internet, local area networks (LANs), wide area networks (WANs), and/or other suitable communications networks.

Therefore, subscribers access communications equipment, such as modems, by coupling through switching part 18 to communications part 20, and communications part 20 provides subscribers access to outside networks by coupling to these outside networks through network interface card 14. Alternatively, switching part 18 may couple subscribers to backup communications equipment on redundant communications cards, with the backup communications equipment providing the subscribers access to outside networks. While switching part 18 couples subscribers to backup equipment, a failed or inoperative communications part 20 may be removed and replaced without disrupting service to the subscribers.

This illustration provides a specific example demonstrating a configuration and arrangement of cards and card assemblies. However, this example is not intended to limit multi-part card assemblies to the particular embodiments illustrated. Rather, multi-part card assemblies may be used in any suitable configuration that supports removal and replacement of communications modules without disrupting subscriber access to backup communications modules. In addition, while this example illustrates network interface card 14 and card assemblies 16 having specific numbers and types of connectors, various embodiments may use any number and type of connectors so long as those connectors allow switching part 18 to couple to subscriber lines and to backup communications equipment and allow communications part 20 to couple to switching part 18 and to outside networks.

Figure 2:
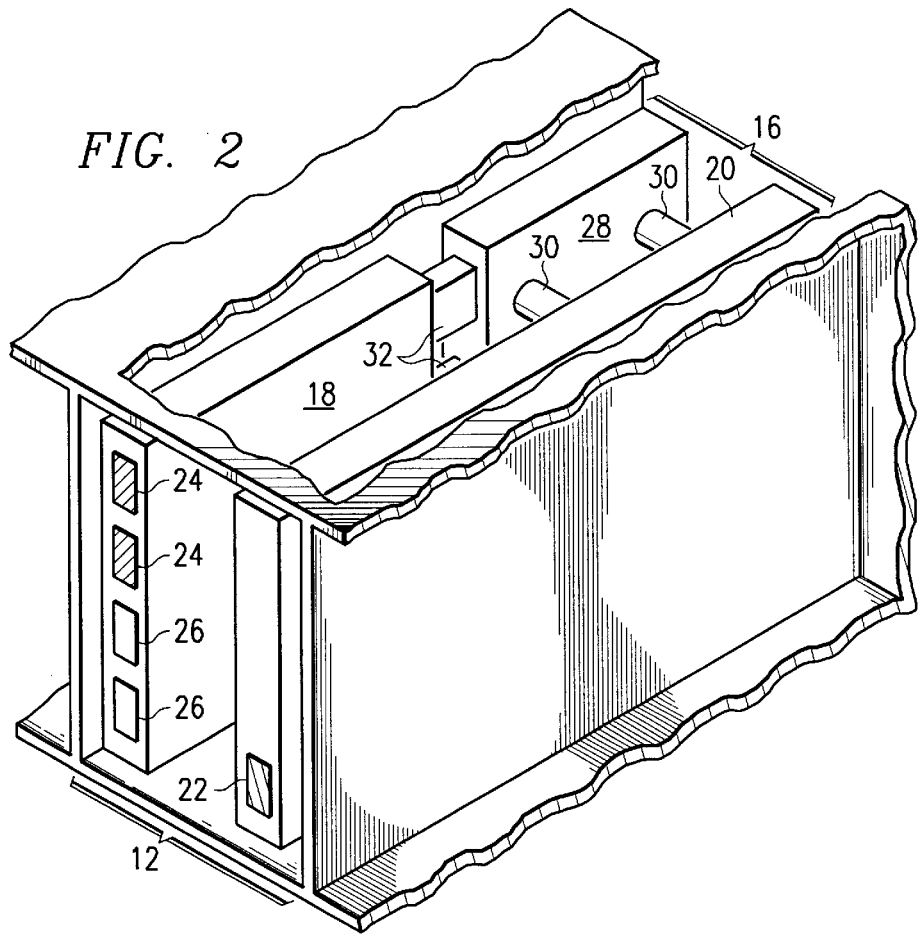
FIG. 2 is a cut-away view illustrating a single slot from the communications equipment rack housing a multi-part card assembly.

FIG. 2 is cut-away view of rack 10 illustrating slot 12 housing card assembly 16. As illustrated by this embodiment, communications part 20 extends substantially through the complete depth of slot 12 such that high speed connector 22 may couple to a mating connector on a backplane of rack 10. In this embodiment, switching part 18 extends only part way through the depth of slot 12 and is positioned in a plane substantially parallel to that of communications part 20. Also, switching part 18 is positioned such that subscriber media connectors 24 and redundancy bus connectors 26 may couple to mating connectors on a backplane of rack 10.

The embodiment in this illustration also includes a second communications equipment part 28 that is attached via board connectors 30 to communications part 20. Slot 12 positions second communications part 28 along substantially the same plane as switching part 18. Thus, in combination, second communications part 28 and switching part 18 may extend substantially through the entire depth of slot 12. Second communications part 28 couples to switching part 18 using card interfaces 32. Therefore, communications part 28 provides a link to switching part 18 for communications modules on both communications part 20 and second communications part 28. In turn, switching part 18 couples to subscriber lines using subscriber media connectors 24 and may couple the subscriber lines to communications modules on communications part 20 and second communications part 28 via interfaces 32.

During normal operations, communications modules on communications part 20 and second communications part 28 provide communications services, such as digital subscriber line (xDSL) services, to subscribers. Communications modules on communications part 20 and second communications part 28 couple to these subscribers using interfaces 32 to couple to switching part 18, which in turn couples to subscriber lines using subscriber media connectors 24. Thus, during normal operations, switching part 18 operates in a first state in which subscriber lines are coupled to communications modules on communications part 20 and second communications part 28. However, given certain circumstances, such as the failure of one or more communications modules, switching part 18 may operate in a second state in which subscriber lines coupled to subscriber media connectors 24 are coupled to a redundancy bus using redundancy bus connectors 26. This provides subscribers using the subscriber lines access to backup communications modules coupled to the redundancy bus, such as a redundancy card in rack 10.

While switching part 18 remains coupled to the backplane of rack 10, communications part 20 and second communications part 28 may be removed and replaced. During this replacement, switching part 18 may maintain the coupling between subscriber lines and the redundancy bus. Therefore, failed or otherwise nonfunctional communications equipment on communications part 20 and second communications part 28 may be removed and replaced without disrupting a subscriber's access to backup communications equipment. This helps to minimize the impact of equipment failures on communications services provided to subscribers.

According to a particular embodiment, various modules on card assembly 16 have different rates of failure. Switching part 18 contains switching modules, which may have relatively low failure rates compared to communications modules on communications part 20 and second communications part 28. For example, because of complexities in communications circuitry, a failure rate for communications part 20 may be ten or more times greater than a failure rate for switching part 18. Therefore, the part of card assembly 16 with a lower rate of failure may continue to be used after a failure of modules on communications part 20 or second communications part 28.

Figure 3:
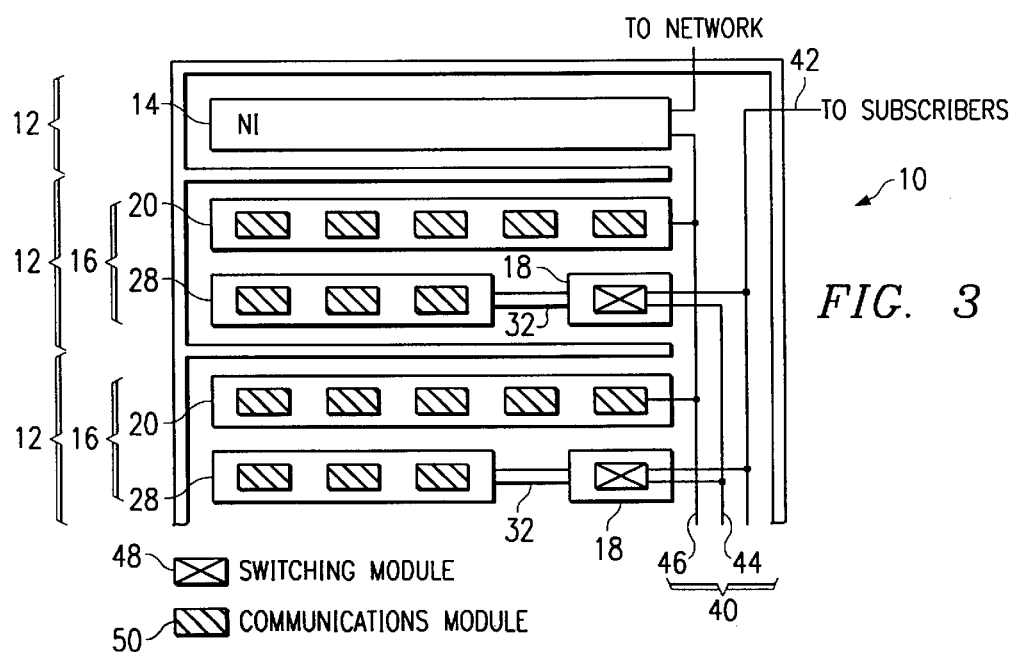
FIG. 3 is a schematic view illustrating multiple slots from the communications rack housing a network interface card and multi-part card assemblies.

FIG. 3 illustrates a schematic view of rack 12 having network interface card 14 and card assemblies 16 inserted into slots 12 such that they couple to a backplane 40 of rack 12. Backplane 40 includes a subscriber bus 42 that couples subscriber lines to switching parts 18 of card assemblies 16, a redundancy bus 44 that couples switching parts 18 of card assemblies 16 to backup equipment such as a redundancy card, and a high speed bus 46 that couples communications modules on card assemblies 16 to network interface card 14. Switching parts 18 of card assemblies 16 each include a switching module, with the symbol for a switching module indicated generally at 48. Communications parts 20 and second communications parts 28 include communications modules, with a symbol for these communications modules indicated generally at 50.

For each card assembly 16, switching module 48 couples to subscriber bus 42, redundancy bus 44, and communications modules 50, which couple to high speed bus 46. Switching module 48 includes a switch implemented using hardware and/or software that selectively couples subscriber lines on subscriber bus 42 to communications modules 50 or to redundancy bus 44. That is, in a first state, switching module 48 couples subscriber lines to communications modules 50, and in a second state, switching module 48 couples subscriber lines to redundancy bus 44. This provides subscribers access to backup communications equipment when communication modules 50 fail, are taken offline, or otherwise become unavailable to provide communications services. Moreover, while in the second state, communications part 20 and second communications part 28 may be removed from slot 12 while switching module 48 remains coupled to backplane 40. Therefore, while communications modules 50 are replaced, switching module 48 may continue to couple subscriber bus 42 to redundancy bus 44.

Figure 4:
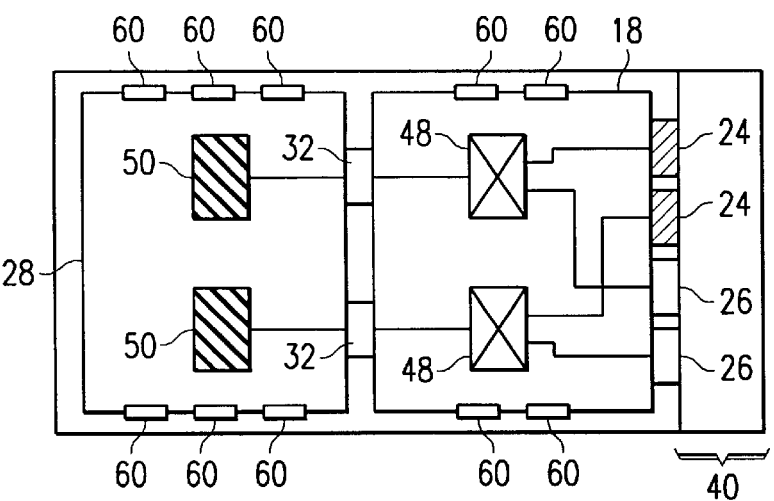
FIG. 4 is a cross-sectional view of a slot in the equipment rack housing one embodiment of a multi-part card assembly housed in a slot of the communications equipment rack.

FIG. 4 illustrates a cross-sectional view of elements of card assembly 16, including switching part 18 and second communications part 28, inserted into slot 12 of rack 10. Second communications part 28 includes communications module 50, and switching part 18 includes switching module 48. According to the embodiment illustrated, switching part 18 has a single subscriber media connector 24 and a single redundancy bus connector 26. Communications part 20 (not visible in this illustration) is positioned behind second communications part 28 and switching part 18 to couple to backplane 40.

In this example, slot 12 of rack 10 includes guides 60 for accepting card assembly 16. Guides 60 represent tabs, grooves, levers, clips, clamps, and/or any other suitable guiding and/or fastening equipment. Guides 60 facilitate the insertion and removal of card assembly 16 to correctly position various connectors with mating parts on backplane 40. More specifically, guides 60 facilitate the removal of communications part 20 and second communications part 28 while maintaining switching part coupled to backplane 40. While this example illustrates a specific number of guides 60 having a particular form, slots 12 of rack 10 may use any suitable equipment for aligning card assemblies 16. Thus, guides 60 represent any suitable devices or equipment that facilitate the removal of one part of card assembly 16 while another part remains inserted in slot 12.

Figure 5:
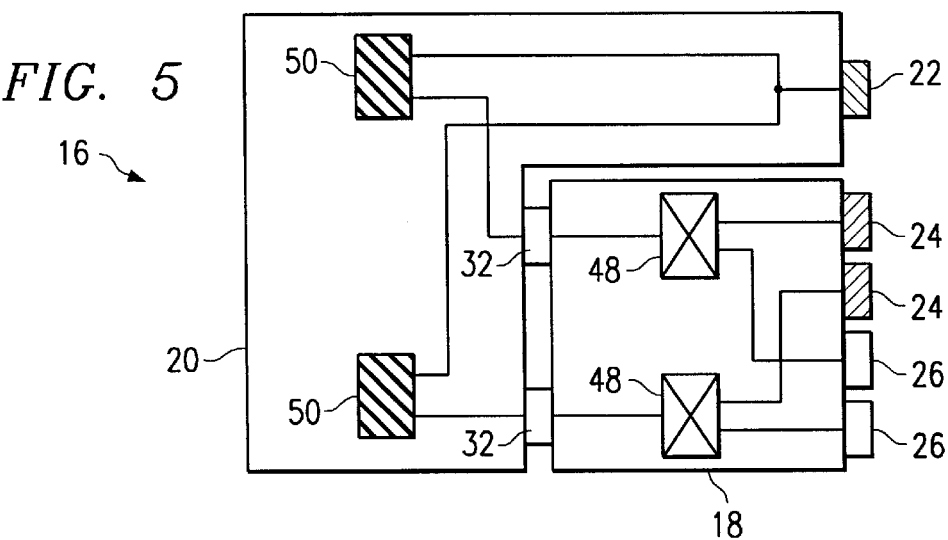
FIG. 5 illustrates a particular embodiment of a multi-part card assembly.

FIG. 5 illustrates a side view of another embodiment of card assembly 16. In accordance with this embodiment, communications part 20 and switching part 18 align within slot 12 along substantially the same plane. Both communications part 20 and switching part 18 couple directly to backplane 40 of rack 10. In this illustration, a portion of communications part 20 extends above switching part 18 to allow high speed connector 22 to couple to backplane 40. Switching part 18 couples to backplane 40 using subscriber media connector 24 and redundancy bus connector 26 and couples to communications part 20 using interface 32. However, as previously discussed, card assembly 16 contemplates using any suitable number and types of connectors. For example, switching part 18 may have multiple subscriber media connectors 24 and redundancy bus connectors 26, or interface 32 may have an equivalent structure to subscriber media connector 24. Furthermore, card assembly 16 contemplates using any appropriate shapes and sizes for various parts to allow communications part 20 and switching part 18 to be inserted within slot 12 of rack 10.

Figure 6:
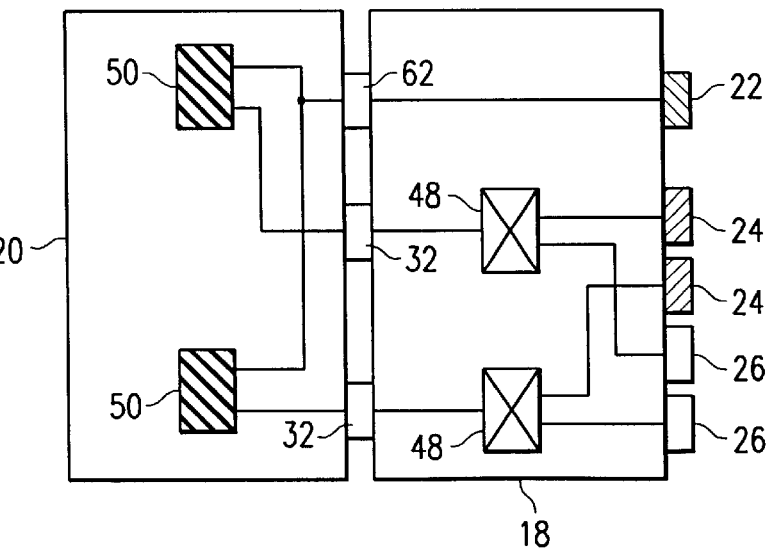
FIG. 6 illustrates another embodiment of a multi-part card assembly.

FIG. 6 illustrates yet another embodiment for a configuration of card assembly 16. According to this embodiment, switching part 18 includes high speed connector 22, subscriber media connector 24, and redundancy bus connector 26. Switching part 18 uses these three connectors 22, 24, and 26 to couple to backplane 40. Communications part 20 aligns along substantially the same plane within slot 12 as switching part 18, but communications part 20 does not couple directly to backplane 40. Rather, communications part 20 uses a pass through connector 62 to couple to high speed connector 22 on switching part 18. Thus, according to this embodiment, switching part 18 simply passes signals through from high speed connector 22 to pass through connector 62. However, card assembly 16 contemplates switching part 18 having any suitable hardware and/or software for monitoring and/or processing communications between high speed connector 22 and pass through connector 62. For example, switching part 18 may monitor communications between these connectors to detect failures of communications modules 50 to determine when to couple subscriber lines to redundancy bus 44.

While the preceding examples illustrate specific embodiments having particular shapes, sizes, configurations, components, and other specific elements, these examples are merely illustrative and are not intended to limit the scope or define the precise characteristics of card assemblies 16. Thus, card assemblies 16 contemplate any suitable configuration having at least two parts for insertion in a slot of a communications equipment rack, with one of the parts operable to couple subscriber lines to backup communications equipment while the other part is removed and/or replaced. Furthermore, because card assemblies 16 contemplate any suitable configurations, the drawings illustrating rack 10 and slots 12 of rack 10 are also merely illustrative of particular embodiments. Therefore, rack 10 contemplates any suitable arrangement and configuration of slots 12, with these slots 12 including any appropriate hardware, such as guides 60, facilitating insertion and removal of all or part of card assemblies 16.

Thus, although the present invention has been described in several embodiments, a myriad of changes of modifications may be suggested to one skilled in the art, and it is intended that the present invention encompass such changes and modifications as fall within the scope of the present appended claims.

What is claimed is:

1. A card assembly for insertion in a slot of a communications equipment rack, the card assembly comprising:

a first part having a communications module, the first part removably coupled to a second part;

the second part having a switching module operable in a first state to couple a plurality of subscriber lines to the communications module, the switching module operable in a second state to couple the subscriber lines to a redundancy bus while the first part is removed from the card assembly.

2. The card assembly of claim 1, wherein a failure rate of the first part is at least ten times greater than a failure rate of the second part.

3. The card assembly of claim 1, wherein the communications module is operable to provide digital subscriber line (XDSL) service to subscribers coupled to the subscriber lines.

4. The card assembly of claim 1, wherein:

the redundancy bus couples to a backup communications module; and the switching module comprises a switch that selectively couples the subscriber lines to one of the communications module and the backup communications module.

5. The card assembly of claim 1, wherein the first part and the second part both couple directly to a backplane of a communications equipment rack.

6. The card assembly of claim 1, wherein:

the second part couples directly to a high speed interface; and the communications module couples to the high speed interface via the second part.

7. The card assembly of claim 1, further comprising a third part permanently coupled to the first part and having a second communications module, wherein the third part couples the communications module and the second communications module to the switching module.

8. The card assembly of claim 7, wherein the first part is aligned along a first plane, and the second part and the third part are aligned along a second plane substantially parallel to the first plane.

9. A communications equipment rack comprising:

a backplane having a redundancy bus and a subscriber interface coupled to a plurality of subscriber lines;

a network interface card coupled to a network and to the backplane;

at least one card assembly comprising a first part having a communications module, the first part removably coupled to a second part, the second part having a switching module operable in a first state to couple selected subscriber lines to the communications module, the switching module operable in a second state to couple the selected subscriber lines to the redundancy bus; and at least one slot having guides for accepting each card assembly, wherein the guides facilitate the removal of a selected first part from the rack while a corresponding second part operates in the second state to couple the selected subscriber lines to the redundancy bus.

10. The communications equipment rack of claim 9, wherein a failure rate for each first part is at least ten times greater than a failure rate for each second part.

11. The communications equipment rack of claim 9, wherein each of the card assemblies provides digital subscriber line (xDSL) service to subscribers coupled to the subscriber lines.

12. The communications equipment rack of claim 9, wherein the switching module of each second part comprises a switch that selectively couples the selected subscriber lines to one of the communications module and the redundancy bus.

13. The communications equipment rack of claim 9, wherein, for each card assembly, the first part and the second part both couple directly to the backplane.

14. The communications equipment rack of claim 9, wherein:

the second part of each card assembly couples directly to the backplane; and the communications module of each corresponding first part couples to the network interface card via the second part.

15. The communications equipment rack of claim 9, wherein each card assembly further comprises a third part permanently coupled to the first part and having a second communications module, wherein the third part couples the communications module and the second communications module to the switching module.

16. A method for securing a card assembly in a slot of a communications equipment rack comprising:

inserting a first part of a card assembly in a slot of a communication equipment rack such that a communications module of the first part couples to a high speed interface;

inserting a second part of the card assembly in the slot of the communications equipment rack such that a switching module of the second part couples to a redundancy bus and couples to a plurality of subscriber lines, the switching module operable in a first state to couple the subscriber lines to the communications module, the switching module operable in a second state to couple the subscriber lines to a redundancy bus;

while the switching module operates in the first state, detecting an error in operation of first part;

setting the switching module to the second state in response to the detection; and removing the first part while the second part maintains coupling of the subscriber lines to the redundancy bus.

17. The method of claim 16, further comprising inserting the first part and the second part at substantially the same time.

18. The method of claim 16, wherein a failure rate of the first part is at least ten times greater than a failure rate of the second part.

19. The method of claim 16, wherein comprising providing digital subscriber line (xDSL) service to subscribers coupled to the subscriber lines with the communications module while the switching module operates in the first state.

20. The method of claim 16, wherein:

the redundancy bus couples to a backup communications module; and the switching module comprises a switch that selectively couples the subscriber lines to one of the communications module and the backup communications module.

21. The method of claim 16, wherein the first part and the second part both couple directly to a backplane of the communications equipment rack.

22. The method of claim 16, wherein:

the second part couples directly to the high speed interface; and the communications module couples to the high speed interface via the second part.

23. A card assembly for insertion in a slot of a communications equipment rack, the card assembly comprising:

means for inserting a first part of a card assembly in a slot of a communication equipment rack such that a communications module of the first part couples to a high speed interface;

means for inserting a second part of the card assembly in the slot of the communications equipment rack such that a switching module of the second part couples to a redundancy bus and couples to a plurality of subscriber lines, the switching module operable in a first state to couple the subscriber lines to the communications module, the switching module operable in a second state to couple the subscriber lines to a redundancy bus;

means for, while, the switching module operates in the first state, detecting an error in operation of the first part;

means for setting the switching module to the second state in response to the detection; and means for removing the first part while the second part maintains coupling of the subscriber lines to the redundancy bus.

\* \* \* \* \*

UNITED STATES PATENT AND TRADEMARK OFFICE
CERTIFICATE OF CORRECTION

PATENT NO. : 6,829,214 B1
DATED : December 7, 2004
INVENTOR(S) : Robert A. Marshall It is certified that error appears in the above-identified patent and that said Letters Patent is hereby corrected as shown below:

Column 10,
Line 6, after "means for,", delete "while," and insert -- while --.

Signed and Sealed this

Thirty-first Day of January, 2006

JON W. DUDAS
*Director of the United States Patent and Trademark Office*